United States Patent [19]

Eckert, Jr. et al.

[11] 4,424,573
[45] Jan. 3, 1984

[54] SYSTEM FOR ENTERING A POSTAGE METER SERIAL NUMBER INTO A NONVOLATILE MEMORY FROM AN EXTERNAL CHANNEL AFTER ASSEMBLY OF THE METER

[75] Inventors: Alton B. Eckert, Jr., Norwalk; Edward C. Duwel, Trumbull, both of Conn.

[73] Assignee: Pitney Bowes Inc., Stamford, Conn.

[21] Appl. No.: 238,331

[22] Filed: Feb. 26, 1981

[51] Int. Cl.³ .......................... G06F 3/00; G06F 15/00
[52] U.S. Cl. .................................... 364/900; 364/409; 364/464
[58] Field of Search ... 364/200 MS File, 900 MS File, 364/464, 466, 409

[56] References Cited

U.S. PATENT DOCUMENTS

| | | | |
|---|---|---|---|
| 3,792,446 | 2/1974 | McFiggins et al. | 364/900 |
| 4,097,923 | 6/1978 | Eckert, Jr. et al. | 364/900 |
| 4,138,735 | 2/1979 | Allocca et al. | 364/900 |
| 4,218,737 | 8/1980 | Buscher et al. | 364/900 |
| 4,234,932 | 11/1980 | Gorgens | 364/408 |
| 4,249,071 | 2/1981 | Simjian | 364/900 |
| 4,253,157 | 2/1981 | Kirschner et al. | 364/900 |
| 4,271,481 | 6/1981 | Check, Jr. et al. | 364/900 |
| 4,280,180 | 7/1981 | Eckert et al. | 364/900 |

Primary Examiner—Jerry Smith
Assistant Examiner—Gary V. Harkcom
Attorney, Agent, or Firm—Peter Vrahotes; Melvin J. Scolnick; Albert W. Scribner

[57] ABSTRACT

A method for entering the serial number into the nonvolatile memory of an electronic postage meter upon completion of assembly of the meter including the steps of programming a given chip number into a nonvolatile memory to be used in assembly of the meter, assembling the electronic postage meter with a meter body serial number and a nonvolatile memory with a given chip number, communicating the serial number and chip number to a data center, receiving information from the data center in response to the communicating steps, and entering the serial number into the nonvolatile memory if the received information is properly enterable into the meter. In accordance with further aspects of the present invention, an intercommunication system is provided for entering a serial number into the nonvolatile memory of an electronic postage meter upon completion of assembly of the meter, a data center communicates a serial number to the electronic postage meter after assembly of the meter, and an electronic postage meter is provided into which a serial number is enterable upon completion of assembly of the meter.

15 Claims, 2 Drawing Figures

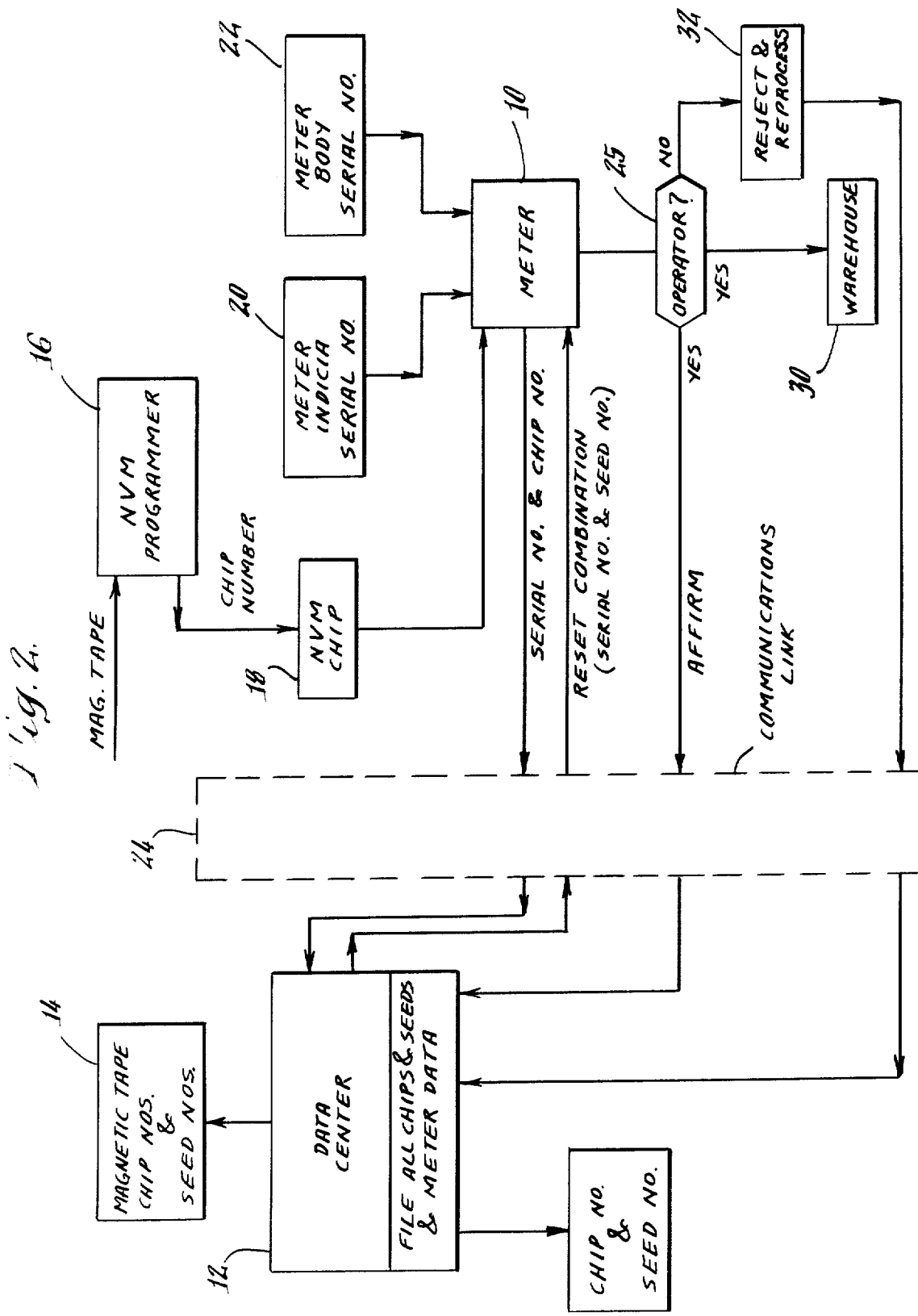

SYSTEM FOR ENTERING A POSTAGE METER SERIAL NUMBER INTO A NONVOLATILE MEMORY FROM AN EXTERNAL CHANNEL AFTER ASSEMBLY OF THE METER

FIELD OF THE INVENTION

The present invention relates to electronic postage meters and more specifically to an electronic postage meter having a nonvolatile memory (NVM).

BACKGROUND OF THE INVENTION

The present invention is applicable to electronic postage meters of the type which include seed numbers for generating postage funding combinations such as disclosed in U.S. Pat. No. 4,097,923, entitled, REMOTE POSTAGE METER CHARGING SYSTEM USING AN ADVANCED MICROCOMPUTERIZED POSTAGE METER, U.S. Pat. No. 3,792,446, entitled, REMOTE POSTAGE METER RESETTING METHOD, U.S. Pat. No. 4,301,507, filed Oct. 30, 1979, in the names of John H. Soderberg, Alton B. Eckert, Jr., and Robert B. McFiggins, entitled, ELECTRONIC POSTAGE METER HAVING PLURAL COMPUTING SYSTEMS, and U.S. patent application Ser. No. 238,330, filed concurrently herewith in the names of Alton B. Eckert, Jr., and Edward C. Duwel, entitled, ELECTRONIC POSTAGE METER WITH WEAK MEMORY INDICATION, all assigned to the same assignee as the present application. The disclosures of which are incorporated herein by reference.

Additionally, systems for enhancing the security of a remotely resettable postage meter are described in U.S. patent application Ser. No. 168,932 filed July 14, 1980, in the names of Edward C. Duwel and Howell A. Jones, Jr., entitled, IMPROVED POSTAGE METER RECHARGING SYSTEM, and U.S. Pat. No. 4,376,299 filed July 14, 1980, in the name of Ronald L. Rivest, entitled, DATA CENTER FOR REMOTE POSTAGE METER RECHARGING SYSTEM HAVING PHYSICALLY SECURE ENCRYPTING APPARATUS AND EMPLOYING ENCRYPTED SEED NUMBER SIGNALS, assigned to the same assignee as the present application. The disclosures of which are incorporated herein by reference.

During assembly of electronic postage meters of the type which include seed numbers for generating postage funding combinations, it is difficult and time consuming to coordinate a nonvolatile memory having a particular serial number programmed therein with a meter body having the same serial number. Moreover, the initial programming of the serial number into the nonvolatile memory increases the likelihood that the serial number of the meter and the nonvolatile memory in the assembled meter will not match, requiring reprocessing.

Further, if the serial number is placed in the NVM prematurely and the NVM fails, the delay in the entire meter assembly system may be quite substantial since the assembler must wait for a new NVM with a matching serial number and with a corresponding program.

SUMMARY OF THE INVENTION

It is an object of the present invention to provide a method and apparatus in which the assembly of an electronic postage meter is independent of the particular nonvolatile memory assembled in the meter.

It is a further object of the present invention to provide a method and apparatus which eliminates the need for prematurely placing the serial number in the NVM of an electronic postage meter.

It is a further object of the present invention to provide a method and apparatus for entry of the stored meter serial number into the NVM via an external channel.

It is a further object of the present invention to provide a factory check to ensure a given NVM is in the assembled meter prior to writing the serial number in the NVM chip.

Briefly, in accordance with the present invention a method is provided for entering the serial number into the nonvolatile memory of an electronic postage meter upon completion of assembly of the meter including the steps of programming a given chip number into a nonvolatile memory to be used in assembly of the meter, assembling the electronic postage meter with a meter body serial number and a nonvolatile memory with a given chip number, communicating the serial number and chip number to a data center, receiving information from the data center in response to the communicating step, and entering the serial number into the nonvolatile memory if the received information is properly enterable into the meter. In accordance with further aspects of the present invention, an intercommunication system is provided for entering a serial number into the nonvolatile memory of an electronic postage meter upon completion of assembly of the meter, a data center communicates a serial number to the electronic postage meter after assembly of the meter, and an electronic postage meter is provided into which a serial number is enterable upon completion of assembly of the meter.

Other objects, aspects and advantages of the present invention will be apparent from the detailed description considered in conjunction with the preferred embodiment of the invention illustrated in the drawings, as follows:

BRIEF DESCRIPTION OF THE DRAWINGS

FIG. 2 is a block diagram showing the interaction between the postage meter and a data center after assembly of the meter to ensure that a given NVM is in the postage meter prior to writing the stored serial number in the NVM.

DETAILED DESCRIPTION

Figure 1:
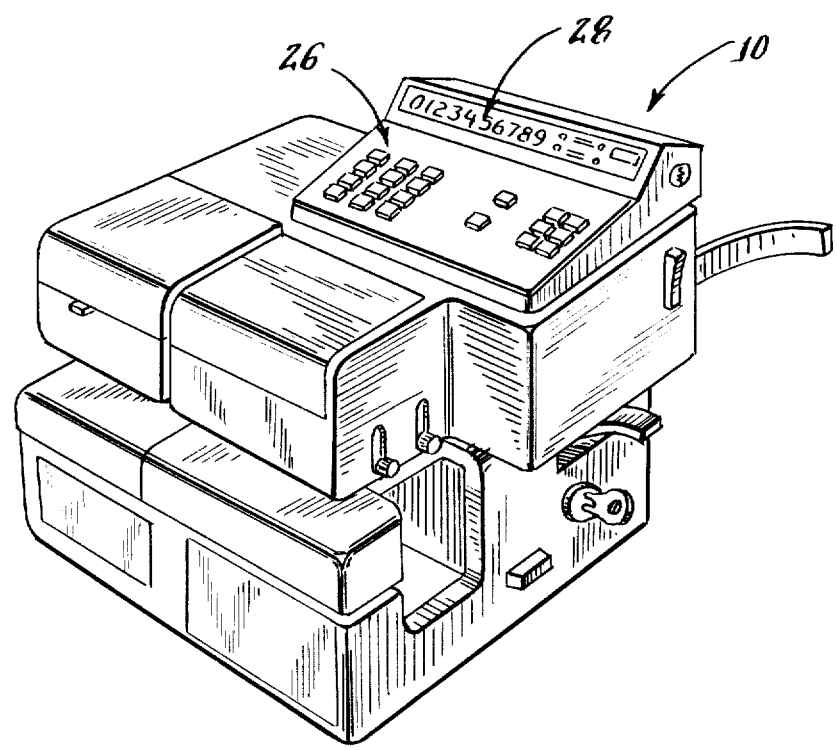
FIG. 1 is a perspective view of an assembled electronic postage meter.

Briefly, during assembly of an electronic postage meter 10 as shown in FIG. 1, a chip number is programmed into the nonvolatile memory (not shown). The chip numbers and associated seed numbers are stored in a data center (not shown). When assembly of the meter 10 is complete, the serial number and chip number are communicated to the data center via a communications link, e.g., a telephone, or a data link. The data center responds with a reset combination based on the serial number and seed number (associated with the chip number) and communicates it, e.g., over a voice answer-back unit (not shown), such as disclosed in aforementioned U.S. Pat. No. 3,792,446, to an operator or directly to the meter 10 from the data center. The reset combination may be entered by the operator through the keyboard 26 and confirmed on meter display 28. If the reset combination is accepted by the meter 10, the chip number is erased from the NVM and the serial number is overwritten (entered) into the nonvolatile memory. If the reset combination is not enterable into the meter 10, the meter 10 is rejected and reprocessed. An affirm signal may be sent to the data center upon acceptance of the reset combination.

Referring to FIG. 1, during manufacture and assembly of an electronic postage meter 10 having an NVM (not shown), the serial number on the printing die (indicia) and case of the meter 10 must be programmed into the NVM before the meter 10 can be commercially utilized. Such electronic postage meters are disclosed in the aforementioned patents and patent applications assigned to the same assignee as the present application.

Referring to FIG. 2, a data center 12 maintains a file for each meter 10, including all chip numbers and the associated seeds therefor. Postage meter and data center systems containing seeds for generating postage funding combinations are disclosed in the aforementioned patents and applications all of which are incorporated herein by reference. The data center 12 generates a number of magnetic tapes 14 which contain NVM chip numbers and the seed numbers associated therewith. The magnetic tape 14 is used by an NVM programmer 16 to program the NVM chip 18, including entering of a chip number into the chip 18. The meter indicia (die) serial number 20 and meter body serial number 22 are incorporated into the meter 10 during assembly. Thereafter, any chip number may be placed in the meter 10. When assembly of the meter 10 is complete communication is established with the data center 12 via a communication link 24, e.g., a telephone or data link, at which time the meter assembler or operator 25 provides the data center 12 with the serial number and chip number. The data center 12, e.g., via a voice answer back system (not shown), or direct data link, provides the meter operator 25 or meter 10 directly, with a reset combination based on the serial number and seed number associated with the particular chip number communicated to the data center 12. If the reset combination is enterable into the meter 10, e.g., via the keyboard 26 and displayed on the meter display 28 as shown in FIG. 1, then the given chip number is in the meter 10 (based on the seed number). After the proper reset combination is entered into the meter 10 the chip number is erased from the NVM chip 18 and the serial number is entered into the NVM chip 18. Thereafter, a flag (bit) is set so that the path to the serial number in the NVM 18 is closed off so that the data field in the nonvolatile memory occupied by the serial number cannot be written into; that is, writing in the nonvolatile memory data field containing the serial number is prevented. The meter 10 is then sent to the warehouse 30 and the operator 25 confirms to the data center 12 that the reset combination was accepted. Thereupon, the data center 12 transfers all information stored under chip number to the proper serial number file and erases the chip number. If the reset combination is not enterable into the meter 10, the operator 25 rejects the meter 10 for reprocessing 32 and communicates the reject information to the data center 12.

More particularly, based on the chip number and serial number communicated to the data center 12, a reset combination is communicated from the data center 12 in accordance with the serial number and seed number associated with the chip number. If the reset combination is accepted by the meter 10, which includes the charging of the meter 10 with money, an acknowledgment is communicated to the data center 12. Thereafter, a second reset combination is communicated to the meter 10 for clearing the money out of the meter 10 prior to shipment to the warehouse 30. A second acknowledgment is then communicated to the data center 12. Then the data center 12 wipes out the chip number file and includes these seeds (associated with the reset combination) in the meter file. It should be appreciated that each new seed number for the meter 10, which changes after each reset combination, is related by an algorithm to the original seed number.

Finally, it should be understood that the reset combination will not be enterable into the meter if the wrong chip number is installed in the meter 10 or the operator erroneously communicates the serial number or chip number or erroneously enters the data from the data center 12 into the meter 10.

It should be apparent to those skilled in the art that various modifications may be made in the present invention without departing from the spirit and scope thereof, as described in the specification and defined in the appended claims.

What is claimed is:

1. An intercommmunication system for communication between a data center of the type that stores postage meter information and electronic postage meters each of which has a nonvolatile memory wherein the intercommunication system supplies information for the entering of a serial number into the nonvolatile memory upon completion of assembly of each meter, comprising:

the data center having storage means for storing a chip number and a seed number for each nonvolatile memory to be used in assembly of the electronic postage meters;

first communicating means for communicating the serial number and chip number of each of the assembled meters to said data center;

data center receiving means for receiving the serial numbers and chip numbers;

generating means located within the data center for generating seed numbers associated with said chip numbers;

second communication means for communicating respective serial numbers and seed numbers to each of the electronic postage meters;

electronic postage meter receiving means located in each postage meter for receiving information from said data center in accordance with its respective serial number and seed number;

means for selectively entering the information from said data center into each electronic postage meter;

means for indicating acceptance of the information by each of the electronic postage meters;

means for writing the serial number in the nonvolatile memory upon acceptance of the information by each electronic postage meter; and means for preventing further writing into the nonvolatile memory where the serial number is written.

2. The intercommunication system recited in claim 1, including:

means for preventing further writing in the data field of the nonvolatile memory where the serial number has been written.

3. The intercommunication system recited in claim 1, wherein:

said communicating means includes a data link.

4. The intercommunication system recited in claim 1, wherein:

said communicating means includes a voice answerback unit.

5. A method for entering a serial number into a nonvolatile memory of an electronic postage meter that is communicatingly connectable with a data center of the type that stores postage meter information and is communicatingly connectable with a plurality of postage meters, wherein the electronic postage meter is assembled within a case having the serial number assigned thereto, the serial number being entered upon completion of assembly of the electronic postage meter, comprising the steps of:

generating chip numbers for entering into a plurality of nonvolatile memories, storing the chip numbers in the data center;

entering one of said chip numbers into the nonvolatile memory to be used in assembly of the electronic postage meter;

assembling the electronic postage meter having the serial number and including the nonvolatile memory with said one chip number;

upon completion of the assembly, communicating the serial number and said one chip number to the data center;

deriving reset information at the data center based upon the serial number and chip number in response to the communicating step;

transmitting the reset information from the data center to the electronic postage meter;

confirming the reset information is properly enterable into the nonvolatile memory;

entering the serial number into the nonvolatile memory if the information received is properly enterable; and preventing further writing into the nonvolatile memory where the serial number is written.

6. The method recited in claim 5, including the steps of:

deriving a seed number based upon the chip number, and storing the chip number for the nonvolatile memory to be used in asembly of the meter and the seed number in a data center.

7. The method recited in claim 5, including the step of:

displaying proper entry of the received information into the meter.

8. The method recited in claim 5, including the step of:

directly entering the information received from the data center into the meter.

9. The method recited in claim 5, including the step of:

communicating to the data center the rejection of the received information in the absence of it being properly enterable into the meter.

10. The method recited in claim 5 including the step of:

rejecting the meter if the received information is not properly enterable into the meter.

11. An electronic postage meter into which a serial number is enterable upon completion of assembly of the electronic postage meter within a case to which the serial number had been assigned, the electronic postage meter being communicatingly connectable to a data center, comprising:

a nonvolatile memory into which a chip number is entered;

means for communicating the serial number of the electronic postage meter and the chip number of the nonvolatile memory to the data center;

means adapted for receiving from the data center reset information based upon the chip number and serial number of the electronic postage meter;

means for entering the received reset information into the meter;

means for writing the serial number of the electronic postage meter into the nonvolatile memory if the received reset information is properly enterable into the meter and means for preventing further writing into the nonvolatile memory where the serial number is written once said means for writing the serial number has written the serial number in the nonvolatile memory.

12. The electronic postage meter of claim 11, wherein:

said means adapted for receiving information includes a data link.

13. The electronic postage meter of claim 11, wherein:

said means adapted for receiving information includes a telephone.

14. The electronic postage meter of claim 11, wherein:

said entering means includes a keyboard.

15. The electronic postage meter of claim 11, wherein:

said entering means includes a data link for directly entering the received information into the meter.

* * * * *